(12) United States Patent
Szybisty et al.

(10) Patent No.: US 7,997,653 B2
(45) Date of Patent: Aug. 16, 2011

(54) STAND UP SEAT

(75) Inventors: Robert J. Szybisty, Livonia, MI (US);
Xiao Jun Wei, Canton, MI (US);
Ephraim Mark DeDios Lapingcao,
Everett, WA (US); Jeffrey P. Carroll,
West Bloomfield, MI (US);
Selvakumaresan Veluswamy,
Farmington Hills, MI (US)

(73) Assignee: Intier Automotive Inc., Newmarket (CA)

( * ) Notice: Subject to any disclaimer, the term of this patent is extended or adjusted under 35 U.S.C. 154(b) by 420 days.

(21) Appl. No.: 12/294,538

(22) PCT Filed: Apr. 5, 2007

(86) PCT No.: PCT/CA2007/000560
§ 371 (c)(1),
(2), (4) Date: Nov. 14, 2008

(87) PCT Pub. No.: WO2007/112586
PCT Pub. Date: Oct. 11, 2007

(65) Prior Publication Data
US 2009/0230744 A1 Sep. 17, 2009

(51) Int. Cl.
*A47C 1/00* (2006.01)
(52) U.S. Cl. ............... 297/336; 297/344.1; 297/334; 296/65.09; 296/65.13
(58) Field of Classification Search ............... 297/331, 297/334, 335, 336, 334.1, DIG. 10; 296/65.05, 296/65.09, 65.13, 65.14
See application file for complete search history.

(56) References Cited

U.S. PATENT DOCUMENTS

| | | | | |
|---|---|---|---|---|
| 2,152,505 A | * | 3/1939 | Kingston et al. | 296/65.09 |
| 3,011,581 A | | 12/1961 | Wood | |
| 4,736,985 A | | 4/1988 | Fourrey et al. | |
| 4,884,843 A | * | 12/1989 | DeRees | 297/331 |
| 5,951,104 A | | 9/1999 | Tsuchiya et al. | |
| 6,000,742 A | * | 12/1999 | Schaefer et al. | 296/65.09 |
| 6,065,804 A | * | 5/2000 | Tanaka et al. | 297/336 |
| 6,070,934 A | * | 6/2000 | Schaefer et al. | 297/14 |
| 6,520,581 B1 | * | 2/2003 | Tame | 297/336 |
| 6,578,919 B2 | | 6/2003 | Seibold et al. | |
| 6,595,588 B2 | | 7/2003 | Ellerich et al. | |
| 6,676,216 B1 | | 1/2004 | Freijy | |
| 6,698,835 B2 | * | 3/2004 | Kojima et al. | 297/344.1 |
| 6,773,068 B2 | * | 8/2004 | Shinozaki | 297/344.1 |

(Continued)

FOREIGN PATENT DOCUMENTS

CA 2448588 12/2002

(Continued)

*Primary Examiner* — David Dunn
*Assistant Examiner* — David E Allred
(74) *Attorney, Agent, or Firm* — Miller Canfield

(57) ABSTRACT

A vehicle seat assembly includes a seat back that is moveable between a first vertical position and a second vertical position forward and upward of the first vertical position. The vehicle seat assembly has a track assembly providing fore and aft adjustment. The vehicle seat assembly further includes at least one pivot assembly operatively coupled to the track assembly and pivotally mounted to a floor of a motor vehicle. The pivot assembly pivots the vehicle seat assembly between the seating position and a stand-up position. A stand-up link slidingly couples the pivot assembly and the seat back. A link lock locks to present a solid link between the pivot assembly and the seat back. The solid link guides the seat back between the first vertical position and the second vertical position as the vehicle seat assembly moves between the seating position and the stand-up position.

14 Claims, 15 Drawing Sheets

U.S. PATENT DOCUMENTS

| | | |
|---|---|---|
| 6,793,285 B1 * | 9/2004 | Tame ............................ 297/336 |
| 6,857,702 B2 * | 2/2005 | Becker et al. ................. 297/341 |
| 7,040,684 B2 | 5/2006 | Tame et al. |
| 7,547,070 B2 * | 6/2009 | Nathan et al. ............ 297/378.12 |
| 7,802,490 B2 * | 9/2010 | Ingraham ........................ 74/505 |
| 2002/0130542 A1 | 9/2002 | Ellerich et al. |
| 2005/0269830 A1 | 12/2005 | Epaud |
| 2008/0224520 A1 * | 9/2008 | Veluswamy et al. .......... 297/335 |
| 2009/0051208 A1 * | 2/2009 | Szybisty et al. ........... 297/463.1 |
| 2010/0141004 A1 * | 6/2010 | Zeimis et al. ................. 297/336 |

FOREIGN PATENT DOCUMENTS

| | | |
|---|---|---|
| FR | 2698327 A1 * | 5/1994 |
| JP | 58036734 A * | 3/1983 |
| WO | WO 2006/128290 A1 | 12/2006 |
| WO | WO 2006128290 A1 * | 12/2006 |

* cited by examiner

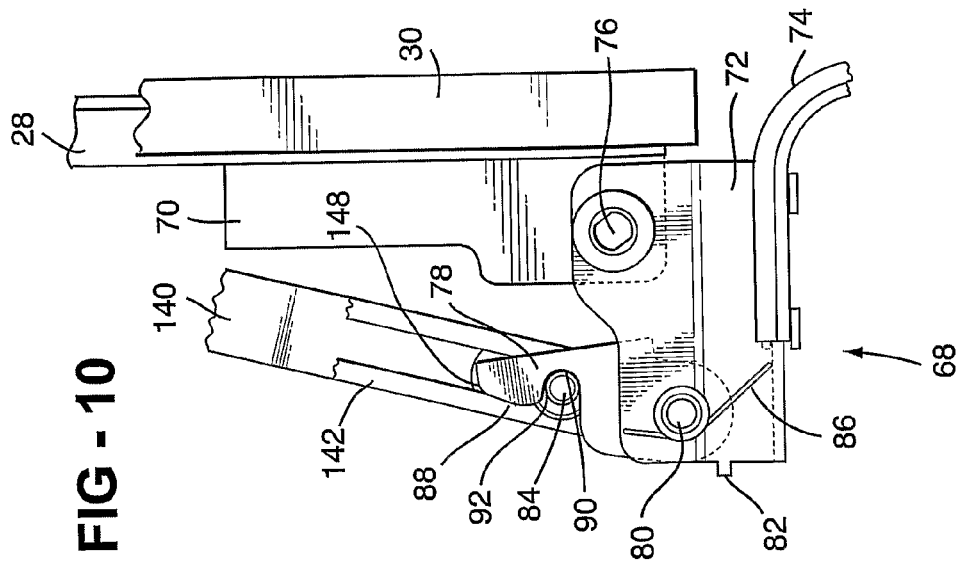
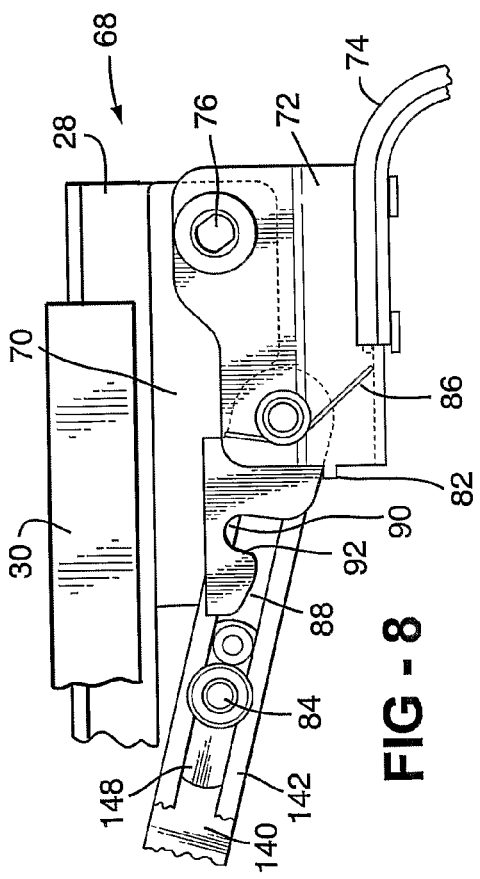
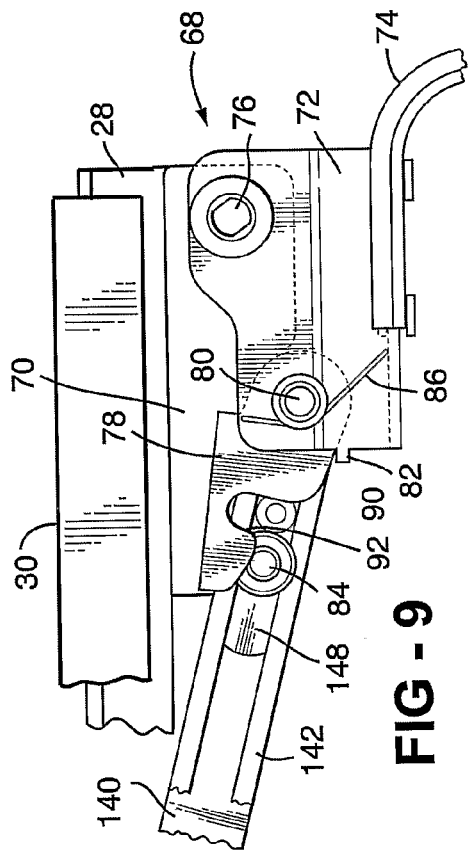

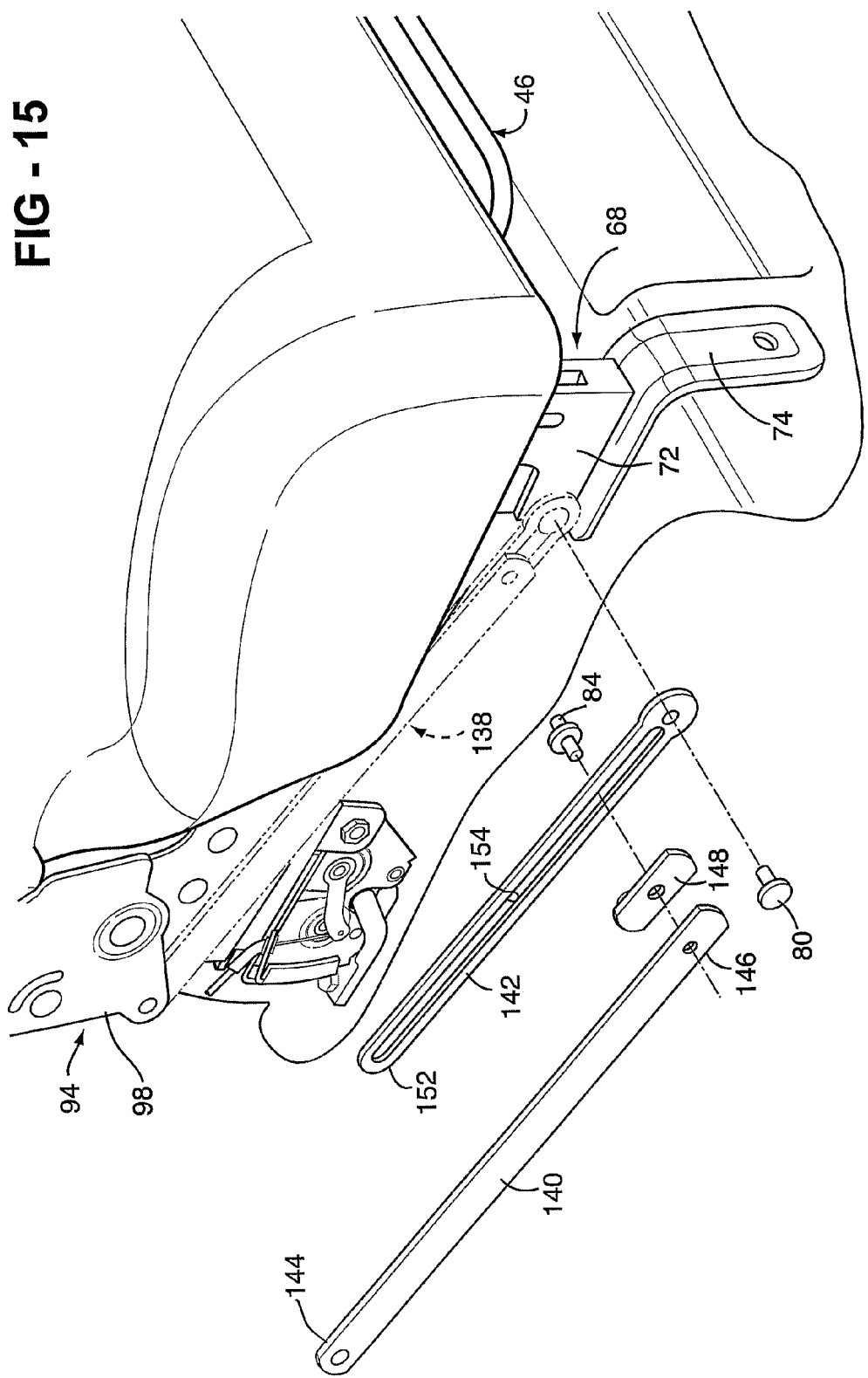

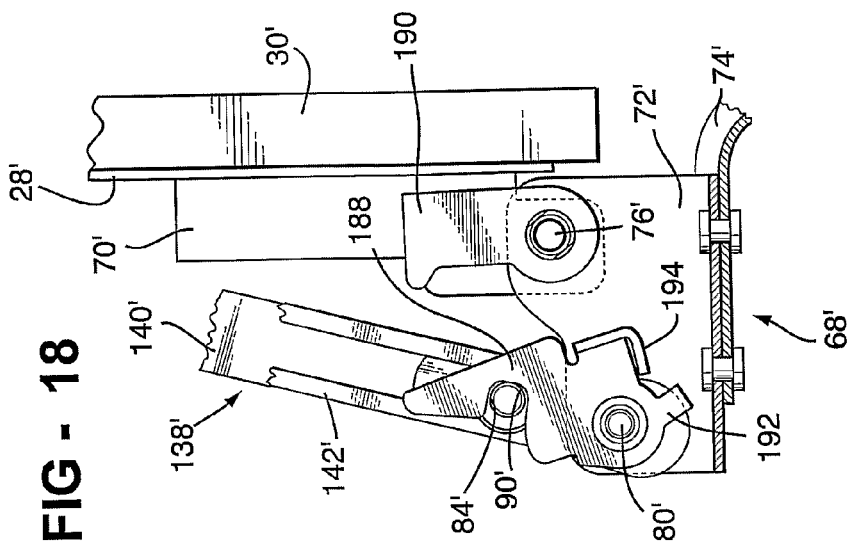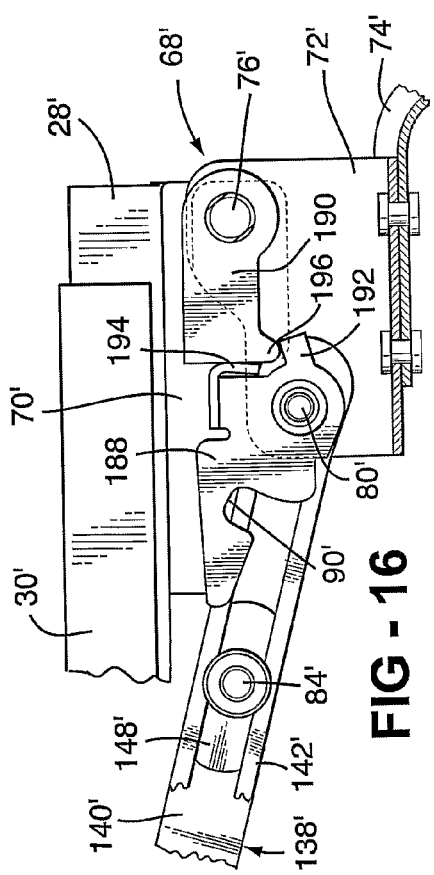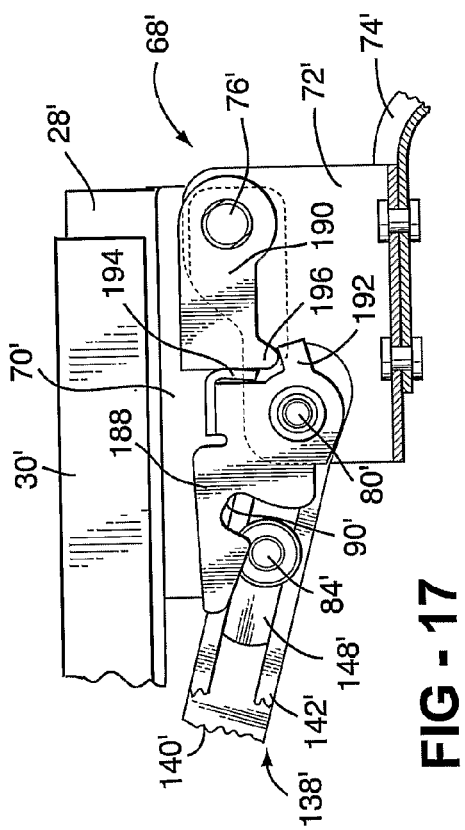

STAND UP SEAT

FIELD OF THE INVENTION

The invention relates to seat assemblies for a motor vehicle. More particularly, the invention relates to improvements in seat assemblies of the type that are capable of being moved forwardly to provide access to a rear compartment in the motor vehicle.

DESCRIPTION OF RELATED ART

In certain minivan and sport utility vehicles, it is common to provide second and third row seating. In order to provide better access to the third row seating, the second row seating has a releasable seat back locking mechanism which is capable of being manually actuated to move the seat back forwardly to an access position. Optionally, the seat assembly may be tumbled forward to provide additional room for ingress and egress.

It has been proposed in U.S. Pat. No. 6,676,216, to provide a seat assembly that has a seat cushion that moves from a seating position to a forward vertical position and a seat back that has a first vertical position for supporting an occupant and a second vertical position forward and upward of the first vertical position to provide greater access to the third row. The seat cushion moves independently of the seat back requiring a two step process for operation. Further, the seat assembly is latched to the vehicle floor allowing only a fixed single position of the seat assembly, without any fore and aft adjustability. It would therefore be desirable to provide a seat assembly having the seat cushion and seat back actuate together into a stand-up position and also having fore and aft adjustability.

SUMMARY OF THE INVENTION

According to one aspect of the invention, a vehicle seat assembly includes a seat back operatively coupled to a seat cushion. The seat back is moveable between a first vertical position and a second vertical position forward and upward of the first vertical position. The vehicle seat assembly also includes a track assembly fixedly secured to the seat cushion for supporting the seat cushion in a seating position. The track assembly provides adjustment of the vehicle seat assembly fore and aft. The vehicle seat assembly further includes at least one pivot assembly operatively coupled to the track assembly and having a distal end configured to pivotally mount to a floor of a motor vehicle. The pivot assembly pivots the vehicle seat assembly between the seating position and a stand-up position. Additionally, the vehicle seat assembly includes a stand-up link slidingly coupling the pivot assembly and the seat back. A link lock, locks the stand-up link thereby creating a solid link between the pivot assembly and the seat back. The solid link guides the seat back between the first vertical position and the second vertical position as the vehicle seat assembly moves between the seating position and the stand-up position.

BRIEF DESCRIPTION OF THE DRAWINGS

Advantages of the present invention will be readily appreciated as the same becomes better understood by reference to the following detailed description when considered in connection with the accompanying drawings wherein:

FIG. 8 is a close-up, side view of a pivot assembly with a pin ahead of a link lock;

FIG. 9 is a close-up, side view of the pivot assembly with the pin abutting the link lock;

FIG. 10 is a close-up, side view of the pivot assembly with the pin engaged within a retention slot of the link lock;

FIG. 15 is an exploded, perspective view of a stand-up link;

FIG. 16 is a close-up, side view of an alternative embodiment of a pivot assembly with a pin ahead of a link lock;

FIG. 17 is a close-up, side view of the alternative embodiment of the pivot assembly with the pin moving under a retention slot of the link lock;

FIG. 18 is a close-up, side view of the alternative embodiment of the pivot assembly with the pin engaged within the retention slot of the link lock;

DETAILED DESCRIPTION OF THE PREFERRED EMBODIMENT

Figure 1:
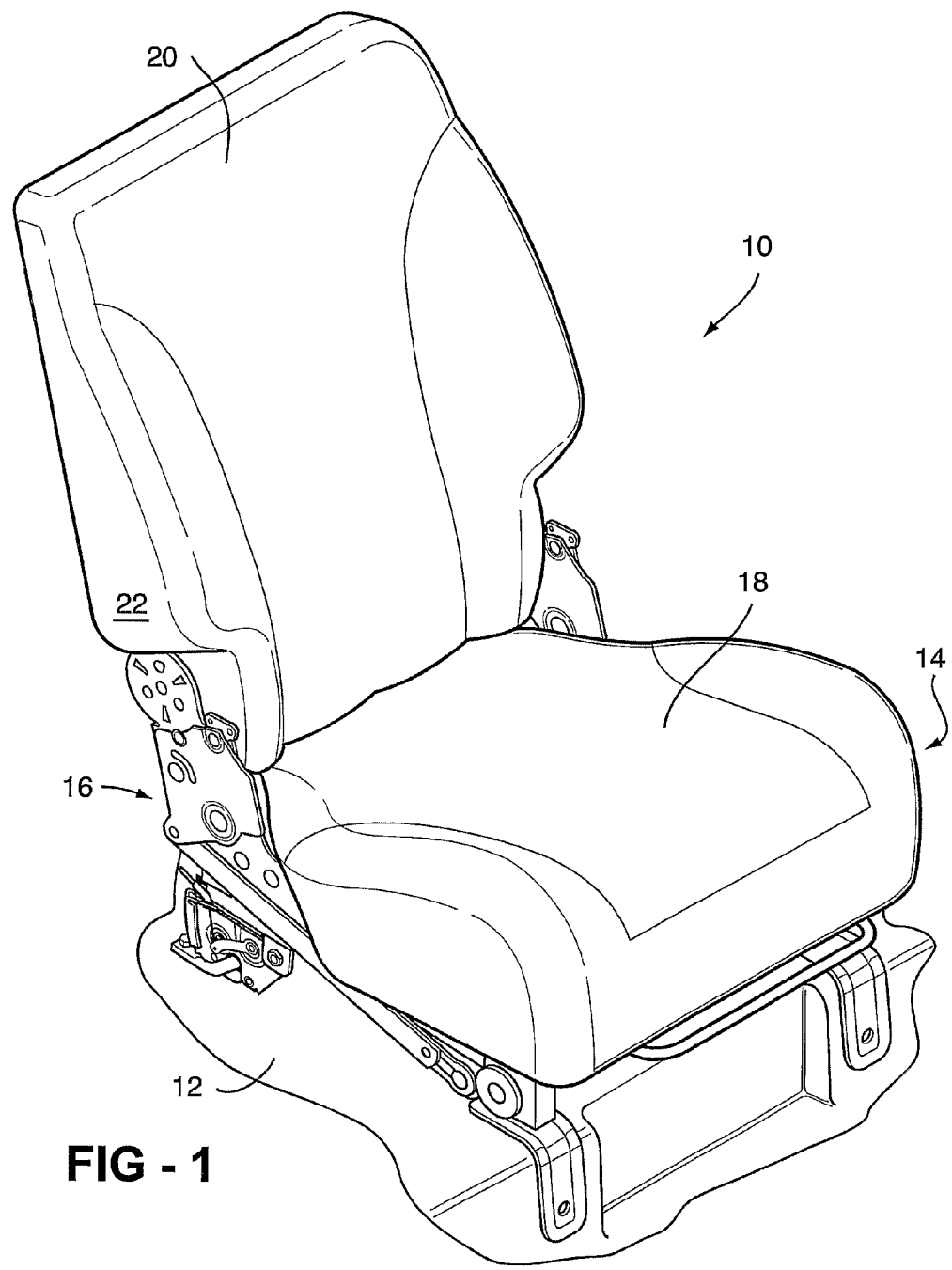
FIG. 1 is a perspective view of a seat assembly in a seating position according to the preferred embodiment of the invention.
Figure 2:
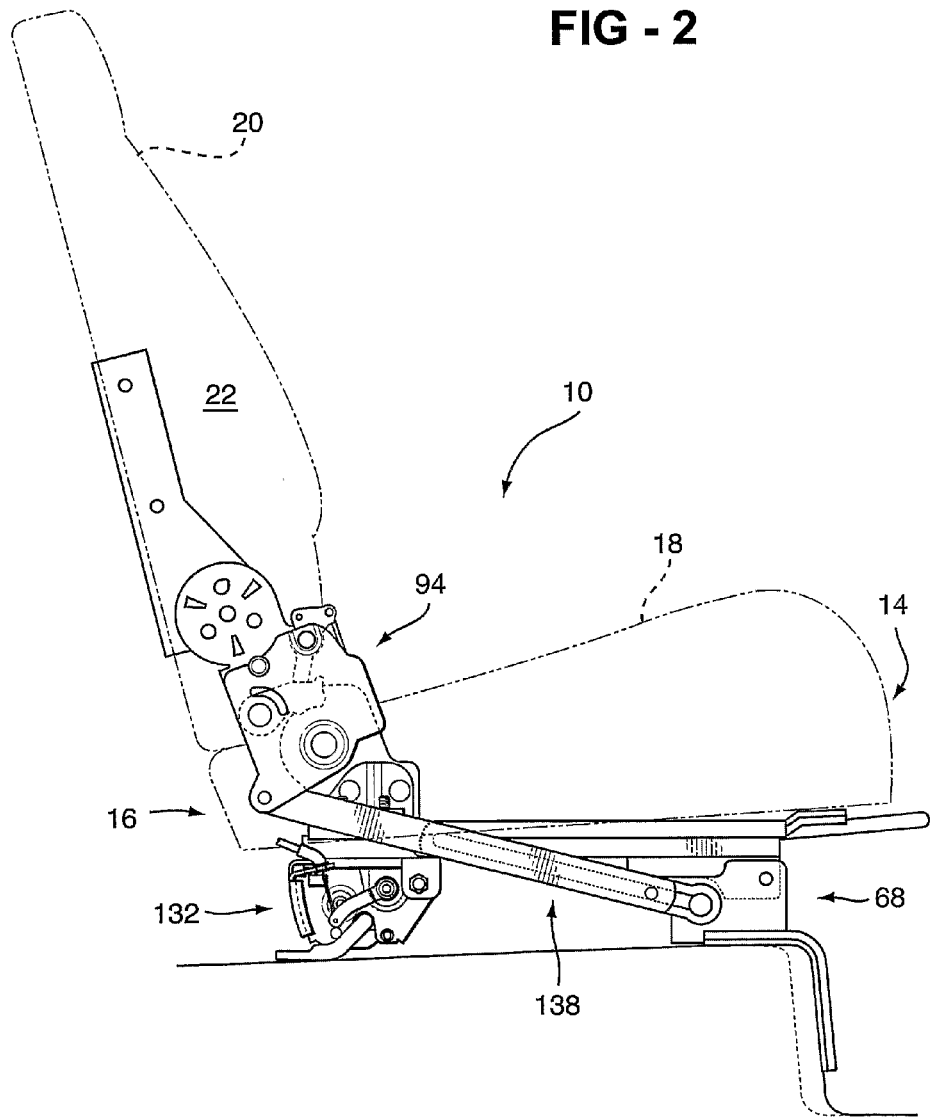
FIG. 2 is a side view of the seat assembly in the seating position.

Referring to FIGS. 1 and 2, a seat assembly is generally shown at 10 for supporting an occupant above a floor 12 in a motor vehicle. The seat assembly 10 extends between a front end and a rear end, generally shown at 14 and 16, respectively. The seat assembly 10 includes a seat cushion 18 and a seat back 20 having side surfaces 22 (one shown).

Figure 4:
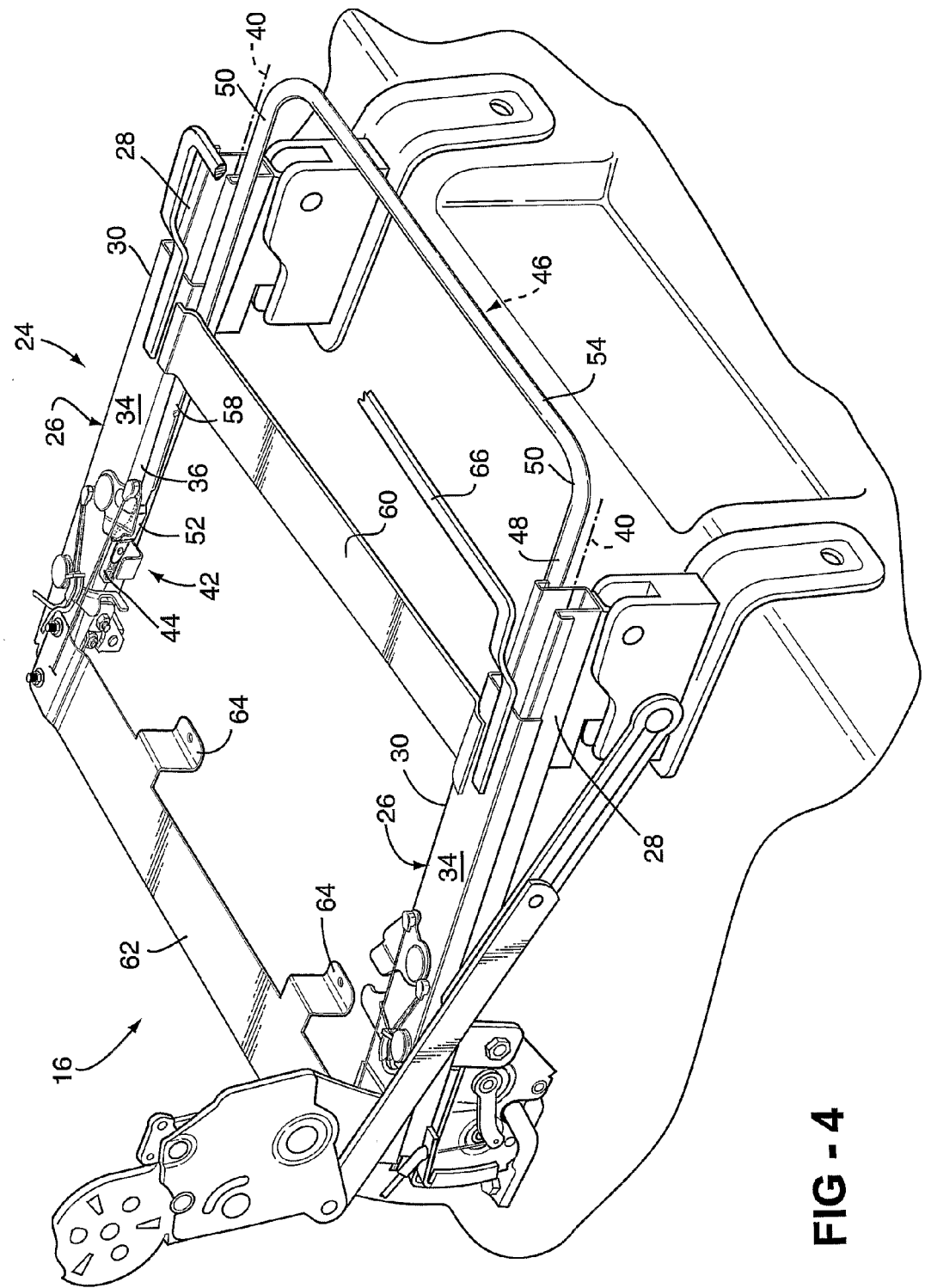
FIG. 4 is a perspective view of a track assembly including a towel bar and a latch mechanism.
Figure 5:
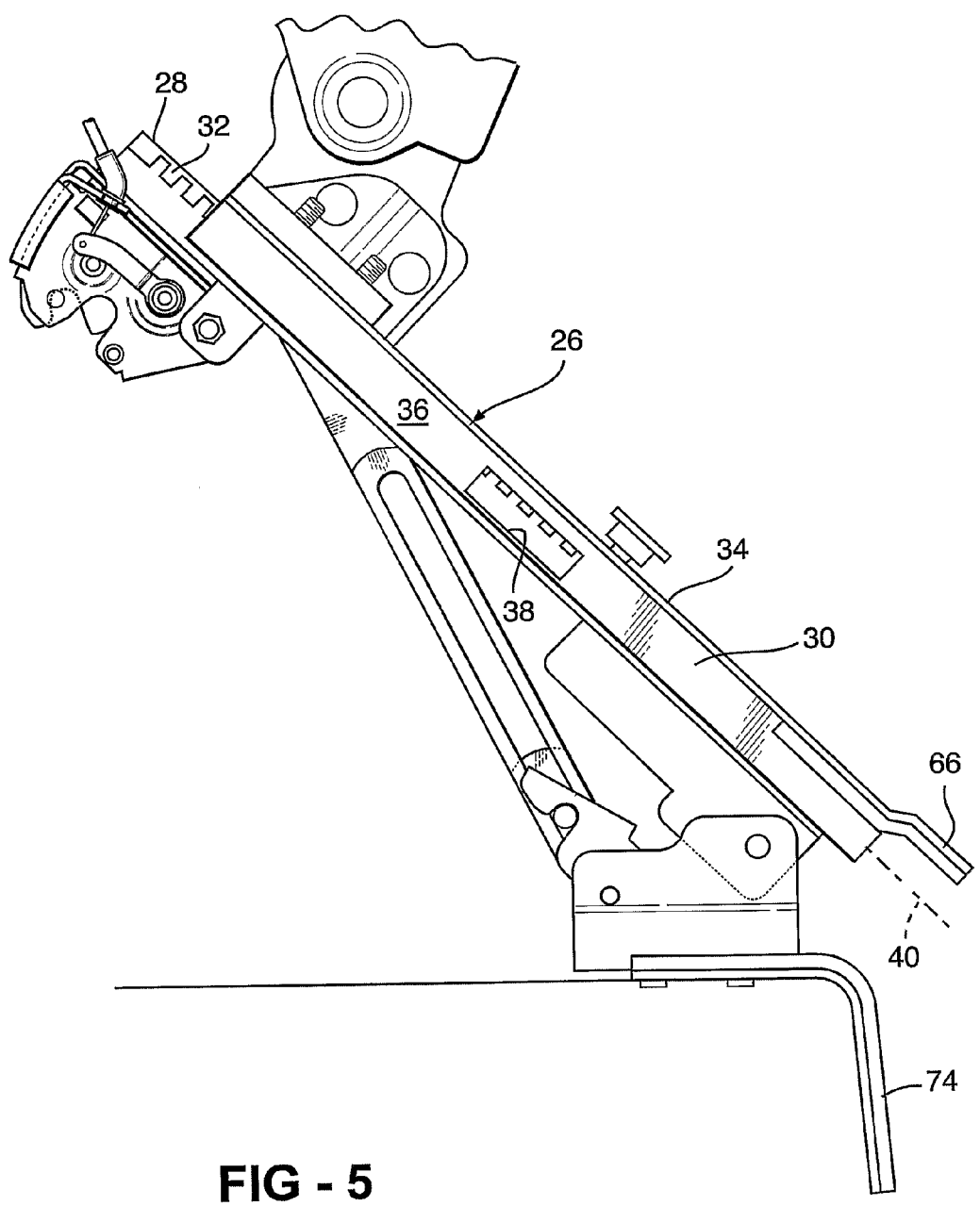
FIG. 5 is a side view of a track mechanism with the seat assembly between the seating position and the stand-up position.

Referring to FIGS. 4 and 5, a track assembly, generally shown at 24, is provided for adjusting the seat assembly 10 fore and aft. The track assembly 24 includes a pair of laterally spaced apart track mechanisms, generally indicated at 26. Each track mechanism 26 includes a fixed track 28 and a moveable track 30 slidingly engaging the fixed track 28. A plurality of locking teeth 32 is disposed along the length of the fixed track 28. The moveable track 30 includes a top surface 34 and an inner side surface 36 having an opening 38 defined therein. The fixed 28 and moveable 30 tracks define a longitudinal axis 40. The moveable track 30 is slidingly adjustable relative to the fixed track 28 along the longitudinal axis 40.

Figure 6:
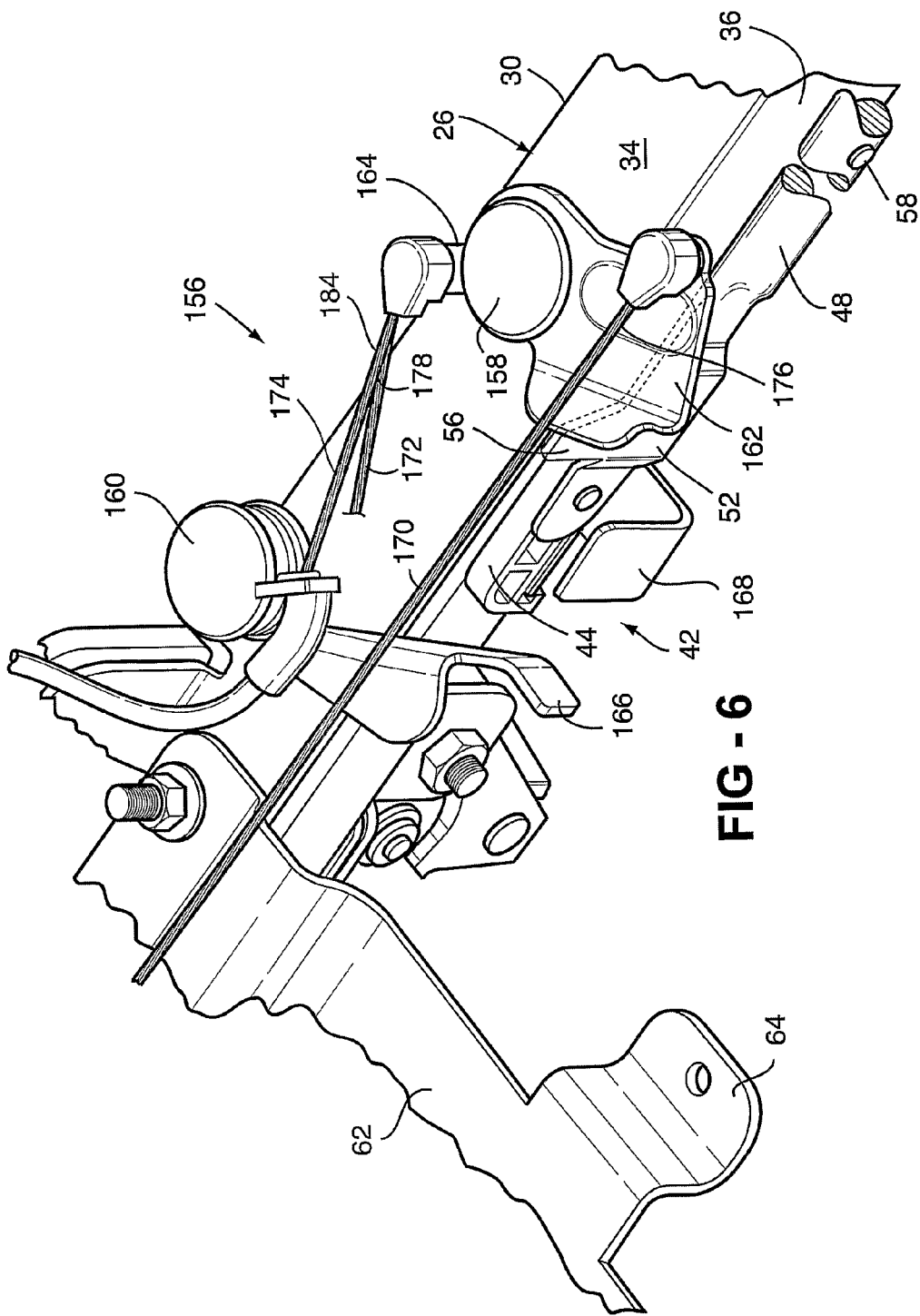
FIG. 6 is a fragmentary, perspective view of a cable assembly with a primary cam and a secondary cam in rest positions.
Figure 7:
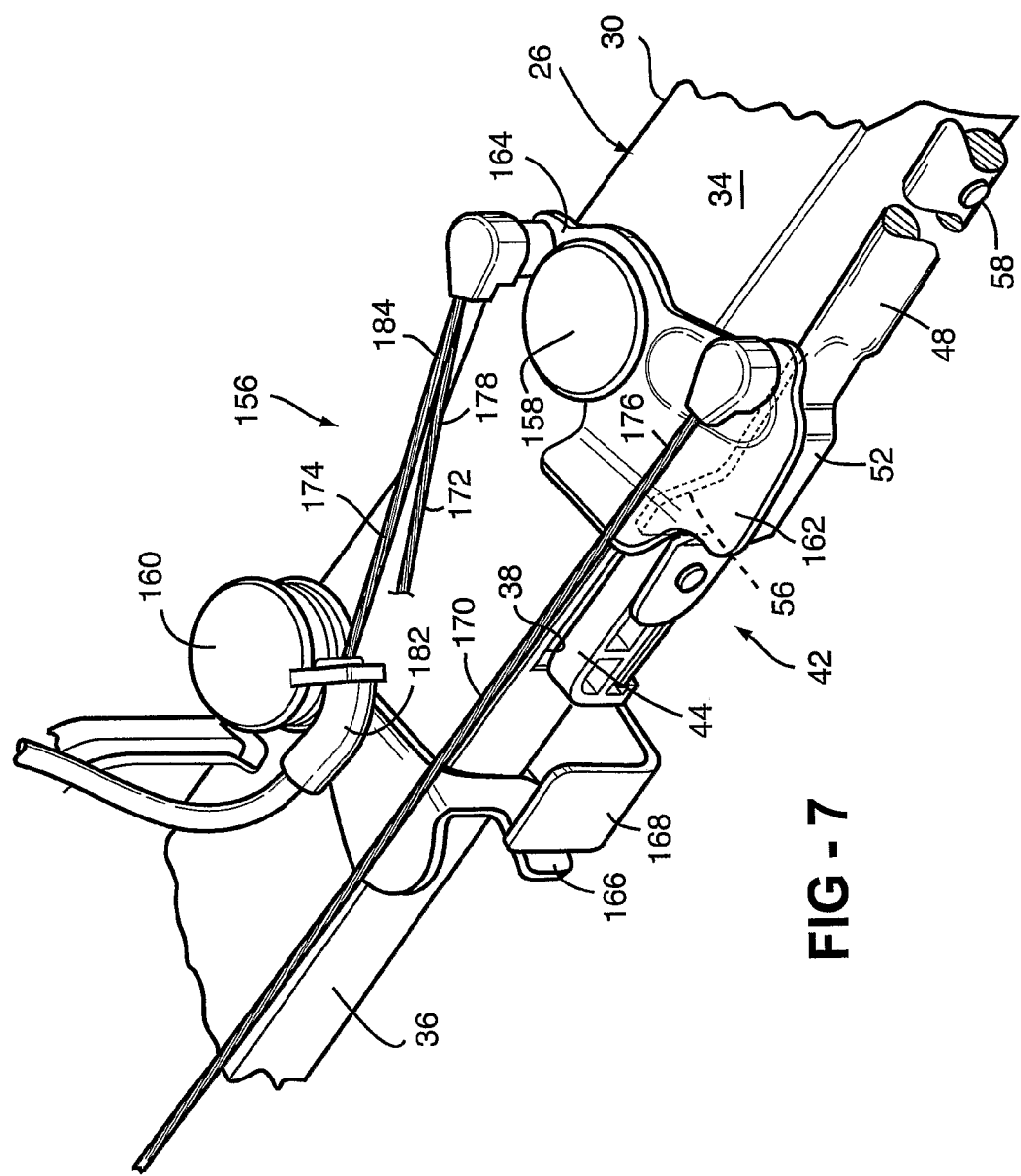
FIG. 7 is a fragmentary, perspective view of the cable assembly with the primary cam and the secondary cam in rotated positions.

Referring to FIGS. 4, 6, and 7, a latch mechanism, generally shown at 42, for selectively locking the moveable track 30 to the fixed track 28 is disposed adjacent to the inner side surface 36 of the moveable track 30 of each track mechanism 26. The latch mechanism 42 includes a latch 44 extending laterally through the opening 38 in the inner side surface 36 of the moveable track 30 and includes windows (not shown) for engaging a portion of the plurality of locking teeth 32 disposed along the fixed track 28 when the latch 44 is in a locked position, as shown in FIG. 6. The latch 44 is biased into the locked position by a leaf spring (not shown), which permits resilient movement of the latch 44 along a vertical path between the locked position and an unlocked position, as shown in FIG. 7. In the locked position, the moveable 30 and fixed 28 tracks are interlocked to prevent movement therebetween, while in the unlocked position, the moveable track 30 is slidingly adjustable relative to the fixed track 28.

Referring back to FIG. 4, a towel bar, generally indicated at 46, for selectively moving the latch 44 between the locked and unlocked positions extends between the laterally spaced apart track mechanisms 26. The towel bar 46 includes a pair of legs 48, each having first and second ends 50, 52. A handle 54 extends laterally between the first ends 50 of the legs 48 and the second ends 52 are fixedly secured to the latch 44. The second ends 52 of the legs 48 include a shark fin 56 extending upward therefrom, as shown in FIG. 6. Referring again to FIG. 4, the legs 48 are pivotally coupled at pivot 58 to the inside surface 36 of the moveable track 30 at a point forward of the latch 44. Lifting upward on the handle 54 of the towel bar 46 causes the legs 48 to pivot about pivot 58, which in turn causes the second ends 52 of the legs 48 to move the latch 44 downward into the unlocked position.

A front seat mount 60 and rear seat mount 62 extend laterally between the top surface 34 of the moveable track 30 of each track mechanism 26 at the front end 14 and rear end 16 of the seat assembly 10, respectively. The seat cushion 18 is fixedly secured to the front and rear seat mounts 60, 62. The rear seat mount 62 includes a pair of tabs 64 fixedly secured thereto. Seat springs (not shown) extend between the tabs 64 secured to the rear seat mount 62 and fixed tabs (not shown) disposed at the front end 14 of the seat assembly 10. Additionally, a stop bracket 66 extends between the laterally spaced apart track mechanisms 26.

Figure 3:
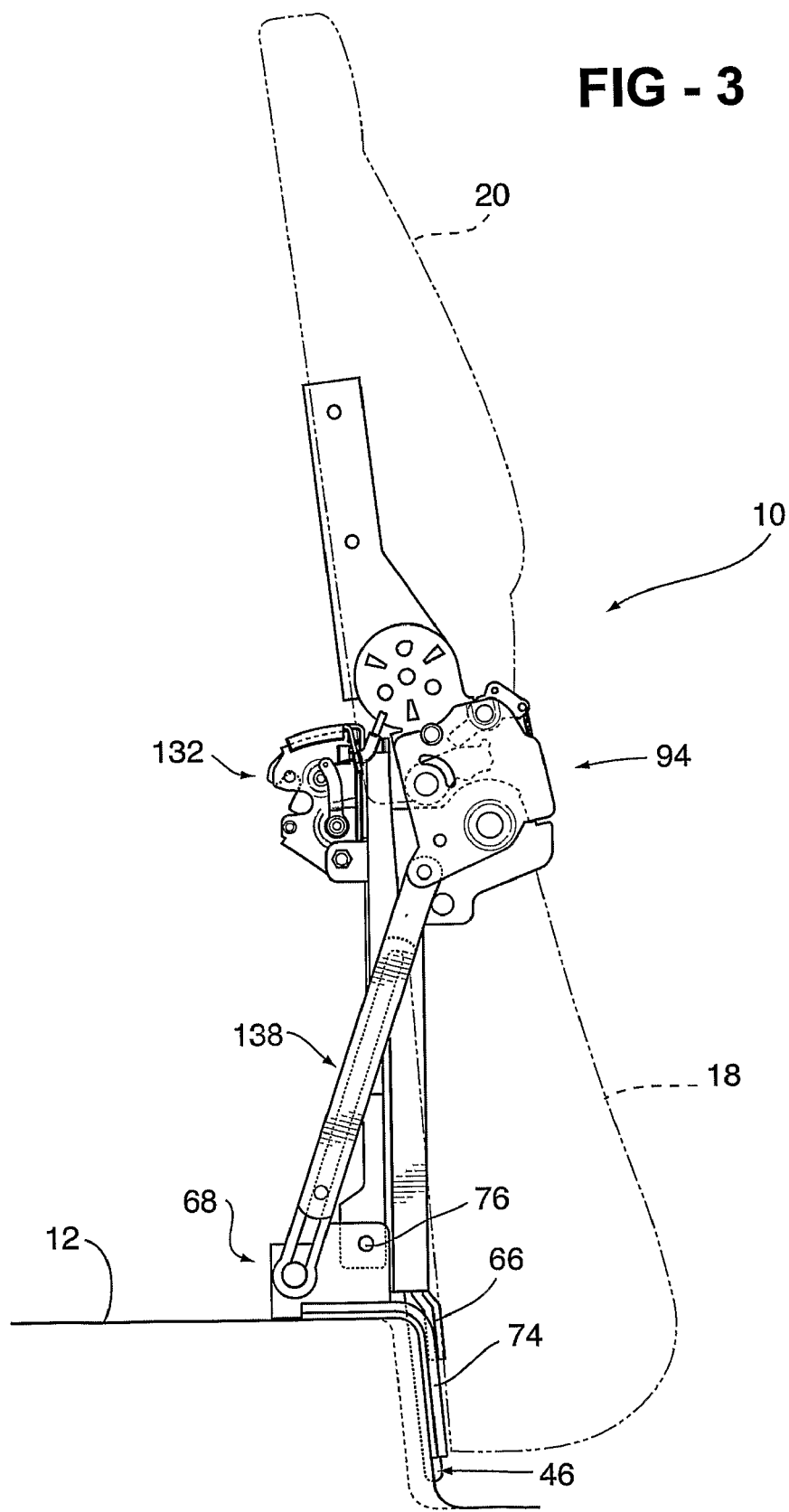
FIG. 3 is a side view of the seat assembly in a stand-up position.

A pair of pivot assemblies, generally shown at 68, disposed at the front end 14 of the seat assembly 10 is provided for pivoting the seat assembly 10 between a seating position, shown in FIG. 2, and a stand-up position, shown in FIG. 3. Referring now to FIGS. 8 through 10, in the preferred embodiment of the invention, each pivot assembly 68 includes a pivot link 70 and a base 72. The base 72 of each pivot assembly 68 is fixedly secured to the floor 12 via a mounting bracket 74. The pivot link 70 is fixedly secured to the fixed track 28 and pivotally coupled at pivot 76 to the base 72. Each pivot assembly 68 also includes a link lock 78 pivotally coupled at pivot 80 to the base 72 for locking the seat assembly 10 in a full-forward seating position before pivoting the seat assembly 10 to the stand-up position, as shown in FIG. 10. The stop bracket 66 abuts the mounting brackets 74 when the seat assembly 10 is in the stand-up position, as shown in FIG. 3.

A locating tab 82 affixed to the base 72 of each pivot assembly 68 is disposed below the link lock 78. The locating tab 82 positions the link lock 78 for receiving a pin 84 when the seat assembly 10 is moved to the full-forward seating position. The link lock 78 is biased against the locating tab 82 by a spring 86. The link lock 78 includes a ramped front edge 88, a retention slot 90, and a rear ramped surface 92. As the seat assembly 10 moves to the full-forward seating position, the pin 84 abuts the ramped front edge 88 of the link lock 78 causing the link lock 78 to pivot upward allowing the pin 84 to slide into the retention slot 90, as shown in FIG. 9. As the seat assembly 10 begins to pivot to the stand-up position, the pin 84 is fully engaged within the retention slot 90. A pivot link spring (not shown) may be included about pivot 76 to urge the seat assembly 10 into the stand-up position. When the seat assembly 10 is moved rearward from the full-forward seating position, the pin 84 contacts the rear ramped surface 92 and the link lock 78 pivots upward allowing the pin 84 to slide out of the retention slot 90.

Figure 11:
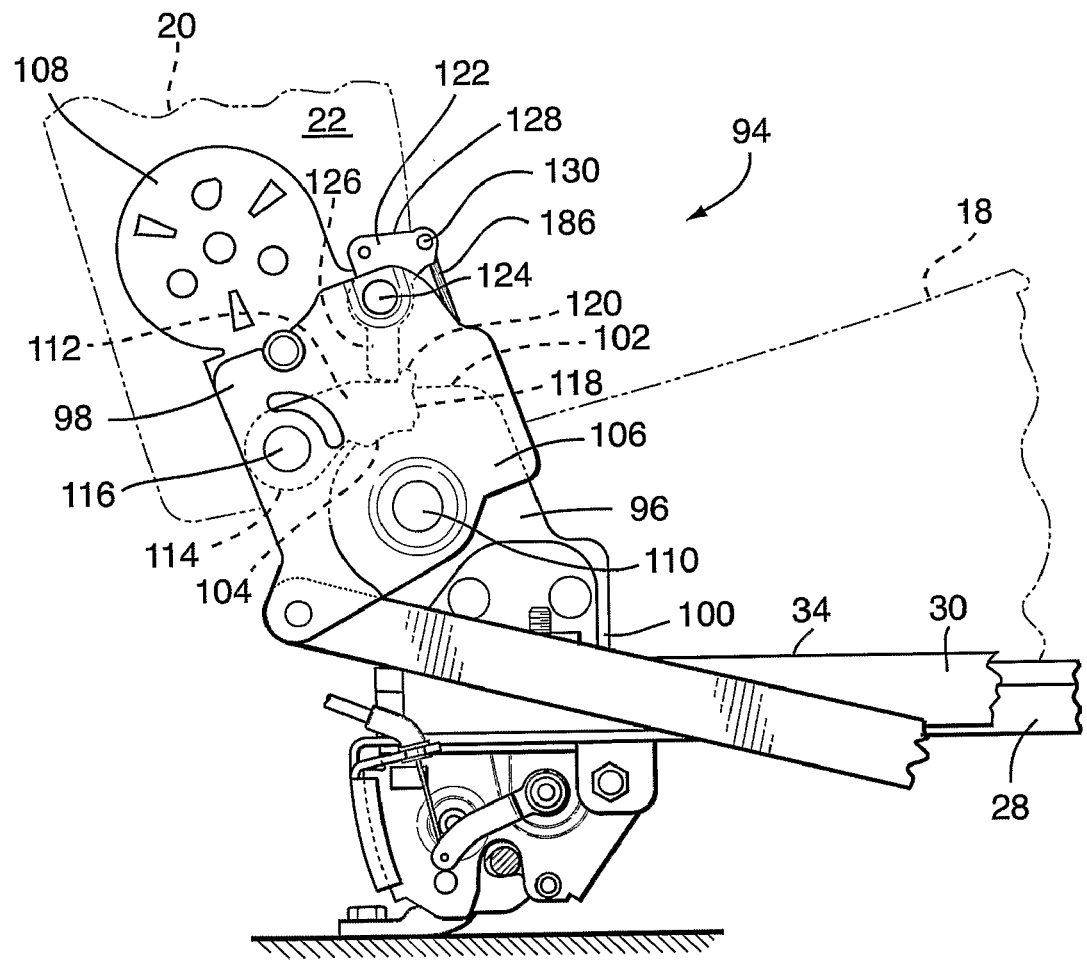
FIG. 11 is a close-up, side view of a recliner assembly with the seat back is a first vertical position.
Figure 12:
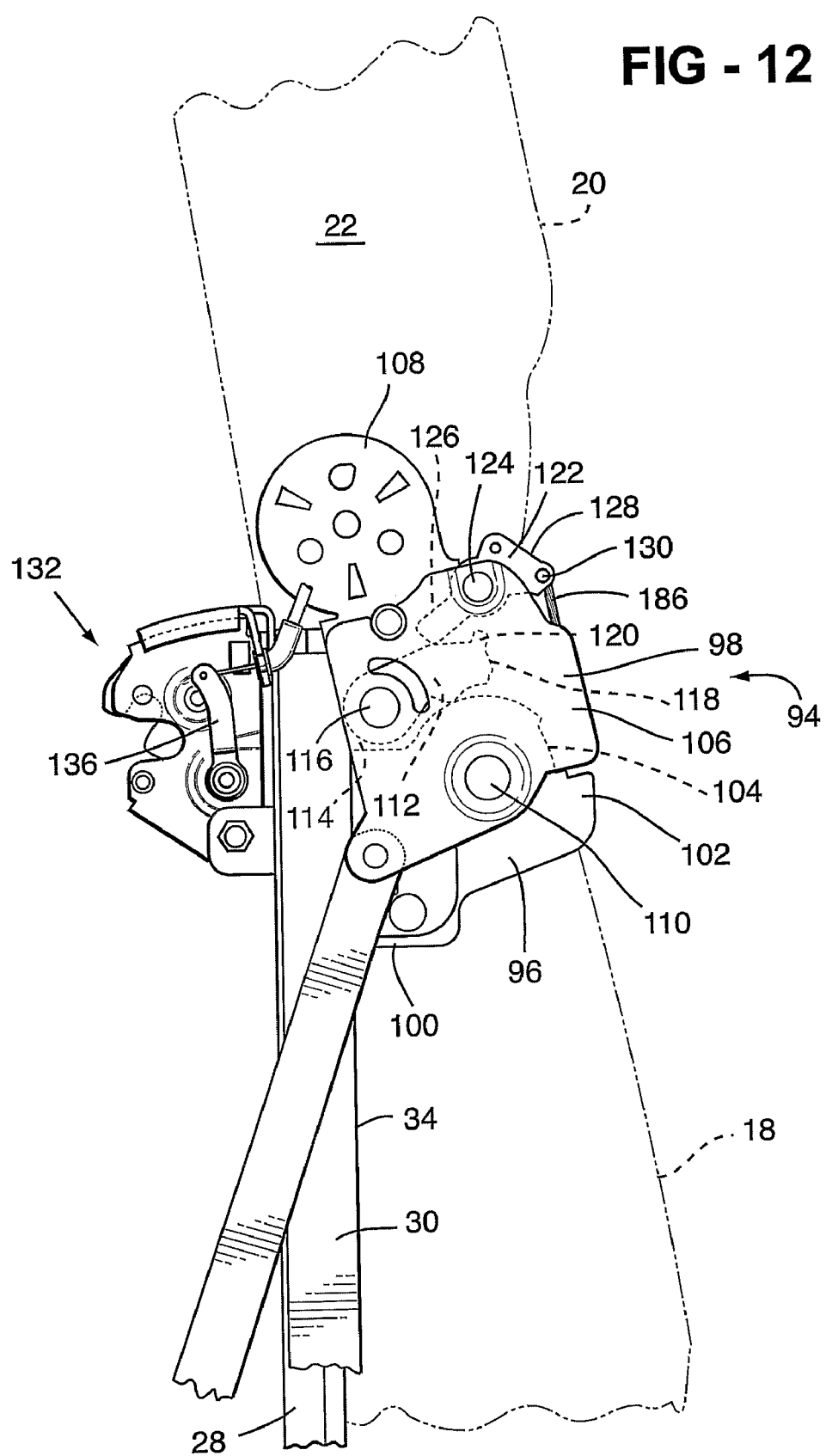
FIG. 12 is a close-up, side view of the recliner assembly with the seat back in a second vertical position.

A pair of recliner assemblies, generally shown at 94, are provided for moving the seat back 20 between a first vertical position, as shown in FIG. 11, when the seat assembly 10 is in the seating position and a second vertical position, forward and upward of the first vertical position, as shown in FIG. 12, when the seat assembly 10 is in the stand-up position. Referring to FIGS. 11 and 12, each recliner assembly 94 extends between the moveable track 30 and the seat back 20 and includes a base segment 96 and a main segment 98. The base segment 96 extends between a bottom end 100 fixedly secured to the top surface 34 of the moveable track 30 and a top end 102 having a notch 104 defined therein.

The main segment 98 extends between a proximal end 106 and a distal end 108. The proximal end 106 is pivotally coupled to the top end 102 of the base segment 96 at pivot 110. The distal end 108 is operatively coupled to the side surface 22 of the seat back 20. The distal end 108 of the main segment 98 is configured to receive a recliner mechanism (not shown). A clock spring (not shown) may be included about pivot 110 to urge the seat back 20 into the second vertical position.

Each recliner mechanism is operatively coupled between the distal end 108 of the main segment 98 and the side surface 22 of the seat back 20. The recliner mechanisms allow selective angular adjustment of the seat back 20 relative to the seat cushion 18 providing a plurality of reclined seating positions.

A pawl 112 extends between a proximal end 114 pivotally mounted to the main segment 98 via a pawl rivet 116 and a free distal end 118 for selectively engaging the notch 104 in the top end 102 of the base segment 96. In addition, the distal end 118 of the pawl 112 includes a tooth 120 extending therefrom. The pawl 112 moves between an engaged position, shown in FIG. 11, with the distal end 118 engaging the notch 104, and a released position, shown in FIG. 12, with the distal end 118 away from the notch 104. When the seat back 20 is in the seating position, the pawl 112 is in the engaged position with the distal end 118 engaging the notch 104.

A cam 122 is pivotally mounted to the main segment 98 via a cam rivet 124 and extends between a first end 126 for selectively abutting the pawl 112 and a second end 128 having a cable attachment point 130. The cam 122 moves between a cam engaged position, shown in FIG. 11, with the first end 126 abutting the tooth 120 on the pawl 112, and a cam released position, shown in FIG. 12, with the first end 126 away from the tooth 120 allowing the pawl 112 to move to the released position. A cam spring (not shown) biases the cam 122 into the cam engaged position.

Figure 13:
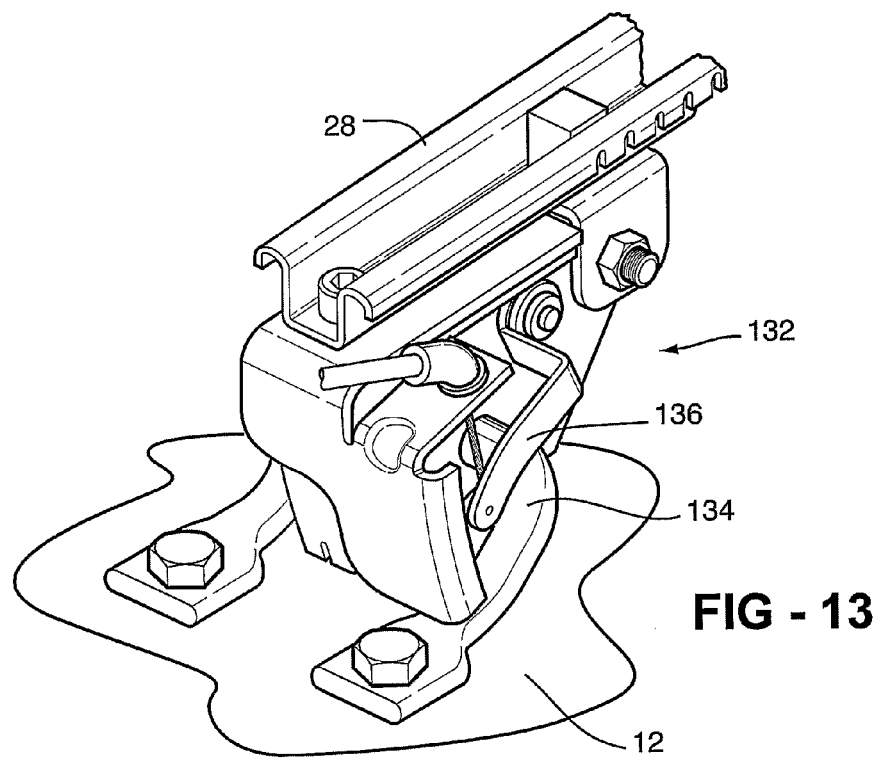
FIG. 13 is a close-up, perspective view of a floor latch engaging a striker.
Figure 14:
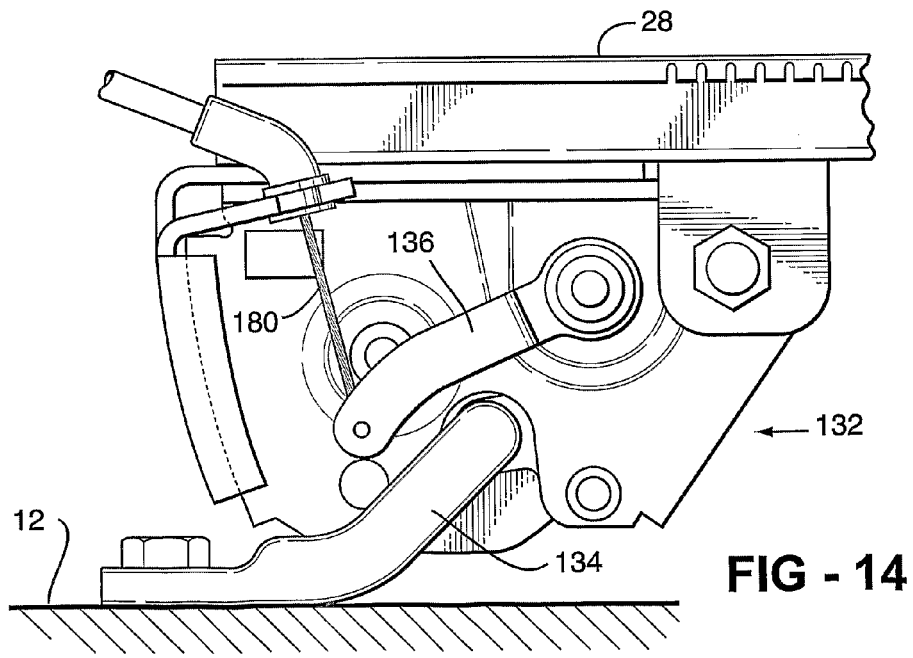
FIG. 14 is a close-up, side view of the floor latch engaging the striker.

A pair of floor latches well known in the art, generally shown at 132, disposed at the rear end 16 of the seat assembly 10 are provided for selectively locking the seat assembly 10 in the seating position to strikers 134 fixedly secured to the floor 12, as shown in FIG. 2. Referring now to FIGS. 13 and 14, the floor latches 132 are fixedly secured to the fixed track 28. Each floor latch 132 includes a release lever 136 operatively coupled thereto. The release lever 136 pivots between a rest position, in which the floor latch 132 is engaged with the striker 134, as shown in FIG. 14, and an actuated position, in which the floor latch 132 is disengaged from the striker 134, as shown in FIG. 12.

A pair of stand-up links, generally shown at 138, extend between the pivot assemblies 68 and the recliner assemblies 94, as shown in FIG. 2. Referring now to FIG. 15, each stand-up link 138 includes a bar 140 slidingly coupled to a rack 142. The bar 140 extends between a first end 144 pivotally coupled to the main segment 98 of the recliner assembly 94 and a second end 146 having a guide 148 with the pin 84 extending axially therefrom. The rack 142 extends between a first end 150 pivotally coupled at pivot 80 to the base 72 of the pivot assembly 68 and a free second end 152. A slot 154 is disposed along the length of the rack 142 allowing the guide 148 and pin 84 to slide therein. When the seat assembly 10 is adjusted fore and aft the guide 148 and pin 84 slide within the slot 154 of the rack 142. When the seat assembly 10 is in the full-forward seating position, the retention slot 90 of the link lock 78 engages the pin 84 creating a solid link between the pivot assembly 68 and the recliner assembly 94.

Referring again to FIGS. 6 and 7, a pair of cable assemblies, generally shown at 156, are provided for actuating the seat assembly 10 from the seating position to the stand-up position. Each cable assembly 156 includes a primary cam 158 and a secondary cam 160, both of which are pivotally coupled to the top surface 34 of the moveable track 30 and are spring biased into rest positions, shown in FIG. 6. The primary cam 158 extends between an inner end 162 and an outer end 164. When the primary cam 158 pivots clockwise from the rest position, shown in FIG. 6, to a rotated position, shown in FIG. 7, the inner end 162 of the primary cam 158 abuts the shark fin 56 on the leg 48 of the towel bar 46 urging the latch 44 to move into the unlocked position, as shown in FIG. 7. The secondary cam 160 is disposed rearward of the primary cam 158 and includes a trigger tab 166 extending axially therefrom. The trigger tab 166 abuts a stop 168 fixedly secured to the fixed track 28 as the seat assembly 10 moves into the full-forward seating position causing the secondary cam 160 to pivot clockwise from the rest position, shown in FIG. 6, to a rotated position, shown in FIG. 7.

Each cable assembly 156 also includes a plurality of cables 170, 172, 174 operatively coupling a release handle (not shown), the floor latch 132, and the recliner assembly 94. First cable 170 extends between a first end (not shown) fixedly secured to the release handle and a second end 176 fixedly secured to the inner end 162 of the primary cam 158. Second cable 172 extends between a first end 178 fixedly secured to the outer end 164 of the primary cam 158 and a second end 180 fixedly secured to the release lever 136 of the floor latch 132, shown in FIG. 14. Third cable 174 disposed through a cable guide 182 mounted on the secondary cam 160 extends between a first end 184 fixedly secured to the outer end 164 of the primary cam 158 and a second end 186 fixedly secured to the cable attachment point 130 at the second end 128 of the cam 122 of the recliner assembly 94, shown in FIG. 11. The third cable 174 includes approximately 10 mm of slack between the first and second ends 184, 186 that is taken-up by actuating the cable assembly 156 to move the seat assembly 10 from the seating position to the stand-up position.

In operation, the seat assembly 10 is normally in the seating position, as shown in FIG. 1. The track assembly 24 can be selectively manipulated by lifting the handle 54 of the towel bar 46 to provide fore and aft adjustment of the seat assembly 10. The recliner mechanisms can be selectively manipulated to provide angular adjustment of the seat back 20 relative to the seat cushion 18. When it is desired to have access to an area behind the seat assembly 10, the operator lifts the release handle to actuate the cable assemblies 156, allowing the seat assembly 10 to be moved from the seating position to the stand-up position.

If the seat assembly 10 is in the full-forward seating position, the pin 84 is in the retention slot 90 of the link lock 78 and the secondary cam 160 is in the rotated position with the trigger tab 166 abutting the stop 168. With the secondary cam 160 in the rotated position, the slack in the third cable 174 is taken-up. Therefore, when the operator lifts the release handle the second end 176 of the first cable 170 is pulled toward the rear end 16 of the seat assembly 10 causing the primary cam 158 to pivot clockwise. As the primary cam 158 pivots clockwise, the outer end 164 of the primary cam 158 pulls the first end 178 of the second cable 172 toward the front end 14 of the seat assembly 10, which causes the second end 180 of the second cable 172 to pivot the release lever 136 of the floor latch 132 from the rest position to the actuated position, disengaging the floor latch 132 from the striker 134. The outer end 164 of the primary cam 158 also pulls the first end 184 of the third cable 174 toward the front end 14 of the seat assembly 10, which causes the second end 186 of the third cable 174 to pivot the cam 122 of the recliner assembly 94 from the cam engaged position to the cam released position. With the cam 122 in the cam released position the pawl 112 of the recliner assembly 94 is free to move to the released position thereby allowing the seat back 20 to pivot counterclockwise. At the same time, the disengaging of the floor latch 132 allows the pivot link spring to pivot the seat assembly 10 in the clockwise direction to a zero gravity position where the floor latch 132 is slightly above the striker 134. If the pivot link spring is not present, the operator uses the same maneuver by which he/she disengages the floor latch 132 to simultaneously pivot the seat assembly 10 clockwise toward the stand-up position. As the operator continues to pivot the seat assembly 10 clockwise, the stand-up link 138, acting as a solid link, pulls the main segment 98 of the recliner assembly 94 counterclockwise causing the seat back 20 to rotate counterclockwise as the seat back 20 moves from the first vertical position, shown in FIG. 2, to the second vertical position, shown in FIG. 3. The seat assembly 10 is in the stand-up position when the stop bracket 66 abuts the mounting brackets 74. In this condition, the seat cushion 18, seat back 20, and stand-up link 138 extend generally vertically from the floor 12. The center of gravity of the seat assembly 10 is slightly over center of pivot 76 allowing the seat assembly 10 to be relatively stable in the stand up position. A lock-out mechanism (not shown) may be included to selectively lock the seat assembly 10 in the stand-up position to provide additional cargo space in the area behind the seat assembly 10. To return the seat assembly 10 to the seating position, the operator pushes the seat back 20 or the seat cushion 18 rearwardly and downwardly until the floor latch 132 engages the striker 134, locking the seat assembly 10 in the seating position.

If the seat assembly 10 is in any seating position other than the full-forward seating position, the pin 84 is not in the retention slot 90 of the link lock 78 and the secondary cam 160 is in the rest position with the trigger tab 166 away from the stop 168. With the secondary cam 160 in the rest position, the slack in the third cable 174 is not taken-up. Therefore, when the operator lifts the release handle the second end 176 of the first cable 170 is pulled toward the rear end 16 of the seat assembly 10 causing the primary cam 158 to pivot clockwise. As the primary cam 158 pivots clockwise, the outer end 164 of the primary cam 158 pulls the first end 178 of the second cable 172 toward the front end 14 of the seat assembly 10, which causes the second end 180 of the second cable 172 to pivot the release lever 136 of the floor latch 132 from the rest position to the actuated position, disengaging the floor latch 132 from the striker 134. The outer end 164 of the primary cam 158 also pulls the first end 184 of the third cable 174 toward the front end 14 of the seat assembly 10, taking-up the slack in the third cable 174. At the same time the inner end 162 of the primary cam 158 abuts the shark fin 56 on the leg 48 of the towel bar 46 urging the latch 44 to move into the unlocked position. With the latch 44 in the unlocked position, the seat springs pull the seat assembly 10 into the full-forward seating position in which the pin 84 is in the retention slot 90. As the seat assembly 10 moves into the full-forward seating position, the trigger tab 166 abuts the stop 168 causing the secondary cam 160 to pivot clockwise from the rest position to the rotated position. As the secondary cam 160 pivots clockwise, the second end 186 of the third cable 174 is pulled downward, which pivots the cam 122 of the recliner assembly 94 from the cam engaged position to the cam released position. With the cam 122 in the cam released position the pawl 112 of the recliner assembly 94 is free to move to the released position, thereby allowing the seat back 20 to pivot counterclockwise. The seat assembly 10 is then moved from the seating position to the stand-up position as described above.

Referring to FIGS. 16 through 18, wherein like primed reference numerals represent similar elements as those described above, in a second embodiment of the invention each pivot assembly 68' includes a pivot link 70' and a base 72'. The pivot link 70' is fixedly secured to the fixed track 28' and pivotally coupled at pivot 76' to the base 72'. Each pivot assembly 68' also includes a link lock 188 and a front cam 190 pivotally coupled to the base 72' at pivots 80' and 76', respectively. The link lock 188 includes a retention slot 90', a tooth 192, and a spring arm 194. The link lock 188 moves between a rest position, shown in FIG. 16, for receiving the pin 84' and a locked position, in which the pin 84' is in the retention slot 90' creating a solid link between the pivot assembly 68' and the recliner assembly 94'. The link lock 188 is spring biased in the counterclockwise direction.

The front cam 190 moves between an engaged position, in which the front cam 190 abuts the link lock 188, as shown in FIG. 16, and a released position, in which the front cam 190 is rotated away from the link lock 188, as shown in FIG. 18. With the front cam 190 in the released position, the link lock 188 fully engages the pin 84' within the retention slot 90' and rotates with the stand-up link 138' between the seating position and the stand-up position. The front cam 190 includes a cam shoulder 196 for abutting the tooth 192 on the link lock 188 when the front cam 190 is in the engaged position, thereby positioning the link lock 188 in the rest position, as shown in FIG. 16.

In operation, when the seating assembly 10' is in the seating position, the cam shoulder 196 of the front cam 190 abuts the tooth 192 on the link lock 188 positioning the link lock 188 in the rest position for receiving the pin 84'. As the seat assembly 10' moves to the full-forward seating position, the pin 84' moves in line with the retention slot 90', as shown in FIG. 17. When the seat assembly 10' begins to pivot clockwise from the seating position to the stand-up position, the pin 84' slides into the retention slot 90' causing the link lock 188 to rotate clockwise. At the same time, the front cam 190 begins to rotate clockwise from the engaged position, on a different arc than the link lock 188, causing the spring arm 194 to flex inward toward pivot 80'. The inward flexing of the spring arm 194 allows the front cam 190 to rotate away from the link lock 188 to the released position allowing the counterclockwise spring bias of the link lock 188 to fully engage the pin 84' within the retention slot 90'. The seat assembly 10' is then moved from the seating position to the stand-up position as described above.

When the seat assembly 10' moves from the stand-up position to the seating position, the link lock 188 and front cam 190 rotate counterclockwise until the cam shoulder 196 of the front cam 190 abuts the spring arm 194, causing the spring arm 194 to flex inward toward pivot 80'. The cam shoulder 196 then abuts the tooth 192 on the link lock 188, thereby positioning the link lock 188 in the rest position and allowing the pin 84' to slide out of the retention slot 90'.

Figure 19:
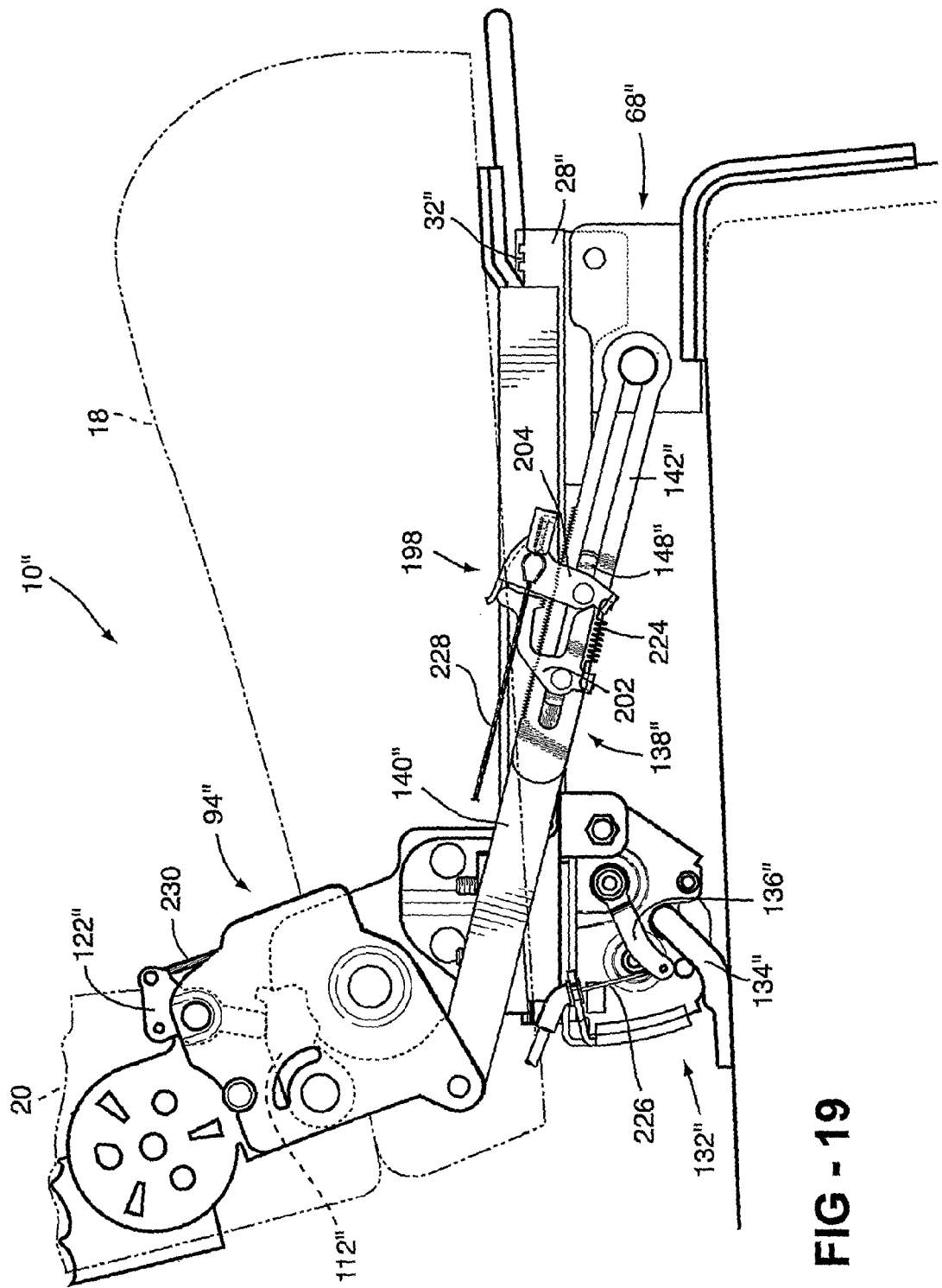
FIG. 19 is a fragmentary, side view of the seat assembly showing an alternative embodiment of a link lock.
Figure 20:
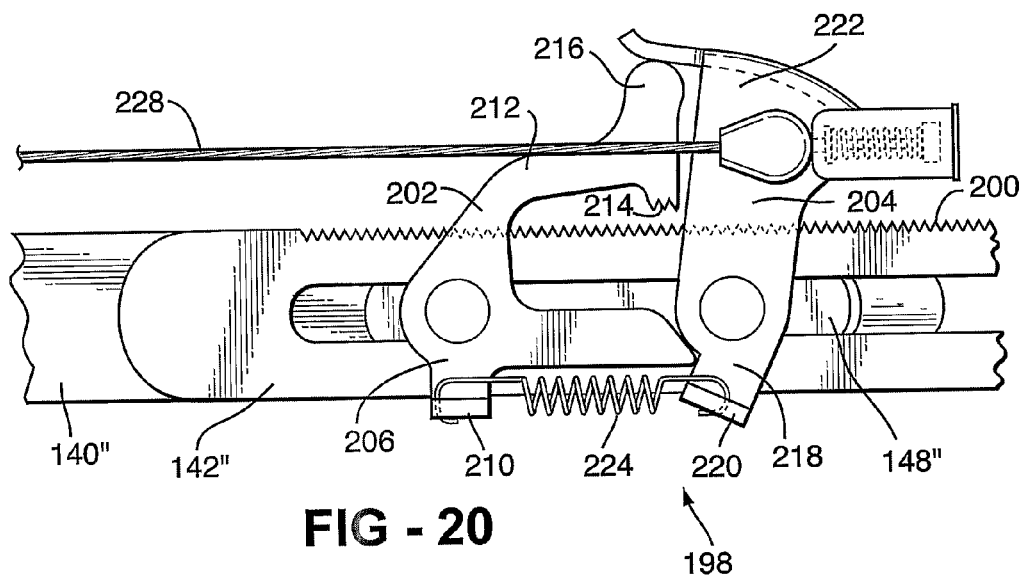
FIG. 20 is a fragmentary, side view of the alternative embodiment of the link lock in an unlocked position.
Figure 21:
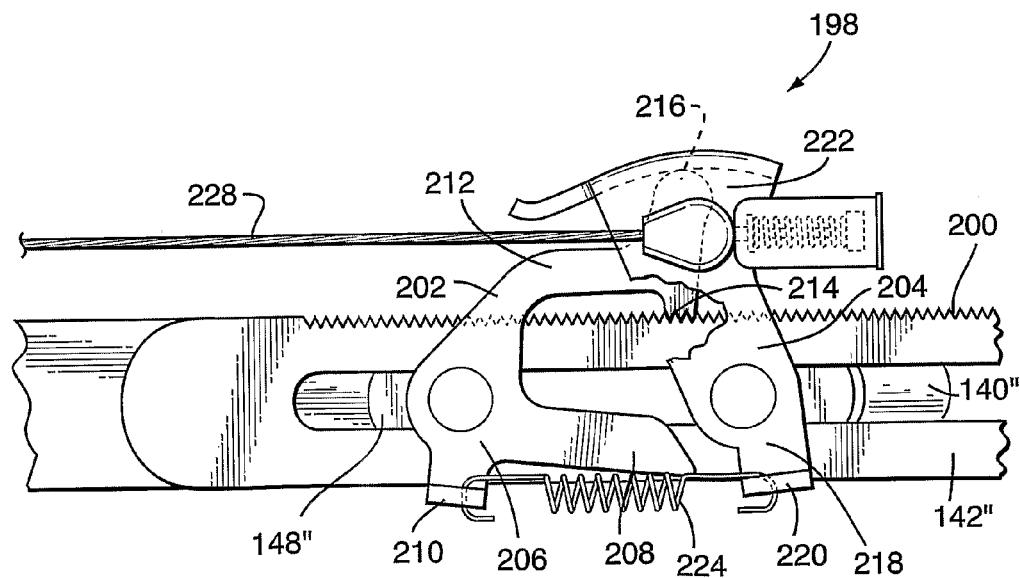
FIG. 21 is a fragmentary, side view of the alternative embodiment of the link lock in a locked position.

Referring to FIGS. 19 through 21, wherein like double-primed reference numerals represent similar elements as those described above, a third embodiment of the invention includes a link lock, generally shown at 198, having a rack and pawl adjustable lock. The link lock 198 is provided for locking the stand-up link 138" to create a solid link between the pivot assembly 68" and the recliner assembly 94", when the seat assembly 10" is in any seating position.

The rack 142" of the stand-up link 138" includes a plurality of rack teeth 200 disposed therealong. The rack teeth 200 are smaller than the locking teeth 32" disposed along the length of the fixed track 28" thereby allowing the link lock 198 to lock the stand-up link 138" when the seat assembly 10" is in any seating position.

The link lock 198 includes a pawl 202 and a cam 204 pivotally coupled to the guide 148" at the second end 146" of the bar 140" of the stand-up link 138". The generally C-shaped pawl 202 includes a lower end 206 having a leg 208 and a tab 210, and an upper end 212 having pawl teeth 214 and a pawl shoulder 216. The cam 204 includes a lower end 218 having a tab 220 and an opposite upper end 222. The pawl 202 and cam 204 pivot between an open position where the pawl teeth 214 are not in contact with the rack teeth 200, shown in FIG. 20, and a locked position where the upper end 222 of the cam 204 is disposed over the pawl shoulder 216 forcing the pawl teeth 214 into locking engagement with the rack teeth 200, shown in FIG. 21. A spring 224 extending between the tabs 210, 220 of the lower ends 206, 218 of the pawl 202 and cam 204 biases the pawl 202 and cam 204 into the open position in which the tab 220 of the lower end 218 of the cam 204 abuts the leg 208 of the lower end 206 of the pawl 202.

In operation, when the operator lifts the release handle with the seat assembly 10" in any seating position, a first cable 226 is pulled upward, which pivots the release lever 136' of the floor latch 132" from the rest position to the actuated position, disengaging the floor latch 132" from the striker 134". When the floor latch 132" is disengaged, a second cable 228 operatively coupled between the floor latch 132" and the upper end 222 of the cam 204 of the link lock 198 pivots the cam 204 counterclockwise over the pawl shoulder 216, causing the pawl 202 to pivot clockwise and forcing the pawl teeth 214 into locking engagement with the rack teeth 200. At the same time, a third cable 230 operatively coupled between the floor latch 132" and the recliner assembly 94" pivots the cam 122" of the recliner assembly 94" from the cam engaged position to the cam released position. With the cam 122" in the cam released position, the pawl 112" is free to move to the released position, thereby allowing the seat back 20" to pivot counterclockwise. The seat assembly 10" moves from the seating position to the stand-up position as described above.

When the seat assembly 10" returns to the seating position with the floor latch 132" engaging the striker 134", the spring 224 extending between the tabs 210, 220 of the lower ends 206, 218 of the pawl 202 and cam 204 bias the pawl 202 and cam 204 into the open position, separating the pawl teeth 214 from the rack teeth 200 in order to permit fore and aft adjustment of the seat assembly 10".

The invention has been described in an illustrative manner, and it is to be understood that the terminology, which has been used, is intended to be in the nature of words of description rather than of limitation. Many modification and variations of the present invention are possible in light of the above teachings. It is, therefore, to be understood that within the scope of the appended claims, the invention may be practiced other than as specifically described.

What is claimed is:

1. A vehicle seat assembly comprising:
    a seat cushion;
    a seat back operatively coupled to said seat cushion, said seat back moveable between a first vertical position and a second vertical position forward and upward of said first vertical position;
    a track assembly fixedly secured to said seat cushion for supporting said seat cushion in a seating position, said track assembly providing adjustment of said vehicle seat assembly fore and aft;
    at least one pivot assembly operatively coupled to said track assembly and having a distal end configured to pivotally mount to a floor of a motor vehicle, said at least one pivot assembly pivoting said vehicle seat assembly between said seating position and a stand-up position;
    a stand-up link slidingly coupling said at least one pivot assembly and said seat back; and
    a link lock for locking said stand-up link thereby creating a solid link between said at least one pivot assembly and said seat back, said solid link guiding said seat back between said first vertical position and said second vertical position as said vehicle seat assembly moves between said seating position and said stand-up position.

2. A vehicle seat assembly as set forth in claim 1 including at least one floor latch for releasably locking said vehicle seat assembly in said seating position to a striker fixedly secured to said floor of said motor vehicle and unlocking said vehicle seat assembly for movement between said seating position and said stand-up position.

3. A vehicle seat assembly as set forth in claim 2 including at least one recliner assembly extending between said track assembly and said seat back, said recliner assembly for moving said seat back between said first vertical position when said vehicle seat assembly is in said seating position and said second vertical position when said vehicle seat assembly is in said stand-up position.

4. A vehicle seat assembly as set forth in claim 3 wherein said track assembly includes at least one track mechanism having a fixed track and a moveable track slidingly adjustable relative to said fixed track.

5. A vehicle seat assembly as set forth in claim 4 wherein said track assembly includes a latch mechanism selectively moveable between a locked position in which said moveable track and said fixed track are interlocked and an unlocked position in which said moveable track is slidingly adjustable relative to said fixed track.

6. A vehicle seat assembly comprising:
    a seat cushion;
    a seat back operatively coupled to said seat cushion, said seat back moveable between a first vertical position and a second vertical position forward and upward of said first vertical position, the second vertical position corresponding to a stand-up position of the vehicle seat assembly;
    a track assembly fixedly secured to said seat cushion for supporting said seat cushion in a seating position, said track assembly providing adjustment of said vehicle seat assembly fore and aft, said vehicle seat assembly moveable to a full-forward seating position before the seat cushion pivots upwardly in the stand-up position; and
    at least one pivot assembly operatively coupled to said track assembly and having a distal end configured to pivotally mount to a floor of a motor vehicle, said at least one pivot assembly having a link lock for locking said vehicle seat assembly in said full-forward seating position before said vehicle seat assembly moves between said full-forward seating position and the stand-up position.

7. A vehicle seat assembly as set forth in claim 6 including at least one floor latch for releasably locking said vehicle seat assembly in said seating position to a striker fixedly secured to said floor of said motor vehicle and unlocking said vehicle seat assembly for movement between said full-forward seating position and said stand-up position.

8. A vehicle seat assembly as set forth in claim 7 including at least one recliner assembly extending between said track assembly and said seat back, said recliner assembly for moving said seat back between said first vertical position when said vehicle seat assembly is in said full-forward seating position and said second vertical position when said vehicle seat assembly is in said stand-up position.

9. A vehicle seat assembly as set forth in claim 8 wherein said track assembly includes at least one track mechanism having a fixed track and a moveable track slidingly adjustable relative to said fixed track.

10. A vehicle seat assembly as set forth in claim 9 including at least one stand-up link slidingly coupling said at least one pivot assembly and said at least one recliner assembly, said at least one stand-up link having a pin extending axially therefrom for engagement with said link lock creating a solid link between said at least one pivot assembly and said at least one recliner assembly when said vehicle seat assembly is in said full-forward seating position, said solid link guiding said seat back between said first vertical position and said second vertical position as said vehicle seat assembly moves between said full-forward seating position and said stand-up position.

11. A vehicle seat assembly as set forth in claim 10 wherein said track assembly includes a towel bar for selectively moving said latch mechanism between said locked position and said unlocked position.

12. A vehicle seat assembly as set forth in claim 11 including a cable assembly having a plurality of cables operatively coupling a release handle, said at least one floor latch, and said at least one recliner assembly, said cable assembly for actuating said vehicle seat assembly from said full-forward seating position to said stand-up position.

13. A vehicle seat assembly as set forth in claim 12 wherein said cable assembly includes a primary cam pivotally mounted on said moveable track, said primary cam for abutting a shark fin comprising a raised element on the towel bar; and urging said latch mechanism into said unlocked position thereby enabling said vehicle seat assembly to move into said full-forward seating position.

14. A vehicle seat assembly as set forth in claim 10 wherein said at least one pivot assembly includes a front cam for positioning said link lock to receive said pin of said at least one stand-up link in said full-forward seating position before said at least one pivot assembly pivots said vehicle seat assembly between said full-forward seating position and said stand-up position.

* * * * *